(12) United States Patent
Ikeda et al.

(10) Patent No.: US 7,812,304 B2
(45) Date of Patent: Oct. 12, 2010

(54) LIGHT GUIDE HAVING LIGHT SCATTERING PATTERNS WITH DIFFERENT LIGHT REFLECTED DIRECTIONS

(75) Inventors: Makoto Ikeda, Tokyo (JP); Hiroyuki Nemoto, Tokyo (JP); Takashi Kishimoto, Tokyo (JP); Takeshi Ishimaru, Tokyo (JP); Hirohiko Iwase, Tokyo (JP); Hidemitsu Takeuchi, Tokyo (JP); Tomihisa Saito, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 189 days.

(21) Appl. No.: 11/920,302

(22) PCT Filed: Apr. 28, 2006

(86) PCT No.: PCT/JP2006/308943

§ 371 (c)(1),
(2), (4) Date: Nov. 19, 2008

(87) PCT Pub. No.: WO2006/120932

PCT Pub. Date: Nov. 16, 2006

(65) Prior Publication Data

US 2009/0218525 A1    Sep. 3, 2009

(30) Foreign Application Priority Data

May 12, 2005   (JP)   ............................... 2005-139272

(51) Int. Cl.
*G01J 1/34* (2006.01)
(52) U.S. Cl. .................................. 250/227.21; 250/205

(58) Field of Classification Search ............... 250/208.1, 250/234–236, 227.11–227.24, 237 R, 205; 358/474–484; 385/140–147, 901, 115, 130, 385/131; 362/551–558, 612
See application file for complete search history.

(56) References Cited

U.S. PATENT DOCUMENTS 7,088,905 B1 * 8/2006 Nemoto et al. ............... 385/147
(Continued)

FOREIGN PATENT DOCUMENTS

JP        08-163320        6/1996
(Continued)

*Primary Examiner*—Que T Le
(74) *Attorney, Agent, or Firm*—Carrier, Blackman & Associates P.C.; Joseph P. Carrier; William D. Blackman

(57) ABSTRACT

A rod-shaped light guide which does not cause unevenness in color at the portion near an incident face is produced by injection-molding transparent resin such as acryl and its surfaces include a light-emitting surface, a bottom face, left and right sides and end faces. One end face opposes a light emitting unit, and light scattering patterns for scattering light incident from the end face are formed on the bottom face. The light scattering patterns are different in shape between a portion near the end face as the incident face and a portion away from the end face. The light scattering patterns formed at the portion near the incident face are composed of a large number of fine hemispherical concaves, whereas the light scattering patterns at the portion away from the incident face are composed of triangular grooves or half cylindrical grooves, and the axial direction of these triangular grooves or half cylindrical grooves coincides with the width direction (sub-scanning direction) of the bottom face on which the patterns are formed.

16 Claims, 11 Drawing Sheets

U.S. PATENT DOCUMENTS

2005/0195618 A1 9/2005 Uemura et al.

FOREIGN PATENT DOCUMENTS

| JP | 2001-201639 | 7/2001 |
| JP | 2001-202815 | 7/2001 |
| JP | 2001-242322 | 9/2001 |
| JP | 2003-197016 | 7/2003 |
| JP | 2004-056425 | 2/2004 |

* cited by examiner

LIGHT GUIDE HAVING LIGHT SCATTERING PATTERNS WITH DIFFERENT LIGHT REFLECTED DIRECTIONS

CROSS-REFERENCE TO RELATED APPLICATIONS

The present application is a U.S. National phase of, and claims priority based on PCT/JP2006/308943, filed 28 Apr. 2006, which, in turn, claims priority from Japanese patent application 2005-139272, filed 12 May 2005. The entire disclosure of each of the referenced priority documents is incorporated herein by reference.

TECHNICAL FIELD

The present invention relates to a light guide used for an image reader and an image reader with the light guide.

BACKGROUND ART

An image reader such as a facsimile, a copying machine, an image scanner or the like is provided with a illuminating device incorporating a rod-like or rod-shaped light guide illuminating linear light on a document surface and an image sensor with a lens array focusing light reflected from the document surface on a line image sensor.

The illuminating device incorporating the rod-like light guide is configured such that light emitting means such as an LED is provided on one end of the rod-like light guide, light from the light emitting means is introduced from the end face into the inside of the guide, light propagating inside the rod-like light guide is scattered by light scattering patterns formed on a side of the rod-like light guide and scattered light is illuminated on the document surface from the light-emitting surface of the rod-like light guide.

In general, the rod-like light guide is of angular rod shape. The light scattering patterns are formed on the side of the light guide such that white pigment is printed by silk screen printing (Patent Document 1).

A method of printing above-described white pigment to form the light scattering patterns requires a printing process which of increases the cost of the guide and causes dispersion of characteristics of the light scattering patterns. Then, Patent Document 2 has disclosed that a concavo-convex portion is formed in advance on a mold cavity for injection molding of the light guide to print the concavo-convex portion on a side of the rod-like light guide to form the light scattering patterns.

In Patent Document 2, triangular grooves, in particular, are selected as the concavo-convex portion, the axis (longitudinal direction) of the triangular grooves is caused to coincide with a width direction of the side of the light guide or to slant relative to the width direction by a predetermined angle.

Patent Document 1: Japanese Patent Laid-Open No. 08-163320
Patent Document 2: Japanese Patent Laid-Open No. 2001-242322

FIGS. 12(a)-(c) are graphs showing relationships on each color basis between displacement in a main-scanning direction and light intensity of a light guide formed such that the triangular grooves thereof as light scattering patterns are formed to coincide with the width direction of the side of the light guide according to a first embodiment of the Patent Document 1. FIG. 12(a) shows light intensities at a floating amount of a document of 0 mm, FIG. 12(b) shows light intensities at a floating amount of a document of 3 mm and FIG. 12(c) shows light intensity ratios at a floating amount of a document of 0 mm and 3 mm.

As can be seen from FIG. 12(a), the intensities of light from each LED chip of RGB substantially coincide with each other at a main-scanning displacement of 10 mm or more, the blue (B) is weaker in intensity than other colors G and R at a region close to the incident end face with respect to a main-scanning displacement of 10 mm and the closer to the end face, the weaker the light intensity of each color becomes.

On the other hand, FIG. 12(b) shows that the light intensities of the blue (B) and the red (R) are extraordinarily high in the vicinity of a main-scanning displacement of 115 mm and the light intensity of the green (G) is higher than those of the blue (B) and the red (R) at a region closer to the incident end face with respect to a main-scanning displacement of 10 mm. In addition, as can be seen from FIG. 12(c), an extraordinary rise is observed on the blue (B) and the red (R) in the vicinity of a main-scanning displacement of 15 mm.

Thus, the extraordinary light intensity of specific colors, for example, the blue (B) and the red (R) in the vicinity of a main-scanning displacement of 15 mm emphasizes the blue (B) and the red (R) in the vicinity of a main-scanning displacement of 15 mm, resulting in unevenness in color.

DISCLOSURE OF THE INVENTION

To solve the above problems, an embodiment of the present invention provides a rod-shaped light guide having an incident face at one longitudinal end thereof, a light-emitting surface at one side thereof, and light scattering patterns at another side thereof for reflecting light toward the light-emitting surface. The light scattering patterns being are formed of concaves and convexes. At a portion of the light guide near the incident face the light scattering patterns have a shape free from an angular dependency whereby light is reflected by the patterns in all directions, including other directions than a direction toward the light-emitting surface, and at a portion of the light guide away from the incident face the light scattering patterns have a shape with an angular dependency whereby light is reflected by the patterns in the direction toward the light-emitting surface.

The term "rod shape" in the present invention refers to a "angular rod shape," for example, square, pentagonal or hexagonal rod shape in end face thereof and includes a rod whose entire side or part of the side are curved and whose light-emitting surface and bottom face on which the light scattering patters are formed are flat. A rod of which end face is of hexagonal shape includes a rod in which flat chambers with an angle at which light reflected by the bottom face is reflected toward the light-emitting surface are formed between the sides and the bottom face.

For the term "angular dependence (directional dependence)," if light, out of light propagating inside the light guide, parallel to the longitudinal direction of the light guide falls on the light scattering patterns and is reflected in a given direction, this case is angle dependent. If light parallel to the longitudinal direction of the light guide falls on the light scattering patterns and is reflected in all directions, this case is free from angular dependence. For example, the triangular grooves or the half cylindrical grooves serving as light scattering patterns reflect light in a given direction, so that they are angle dependent. The hemispheric concaves, hemispheric convexes or white paint reflect light in all directions, so that they are free from angular dependence. Although an individual triangular or half cylindrical groove is angle dependent solely, combining the grooves having different axial directions with each other makes them free from an angular dependency.

The term "portion near the incident face" refers to a range of from the end face to a distance of 50 mm to 70 mm from the end face in the main scanning direction.

The light scattering patterns at the portion near the incident face at one end of the light guide as specific patterns according to an embodiment of the present invention include a large number of fine hemispheric concaves, and the light scattering patterns at the portion away from the incident face include triangular grooves or half cylindrical grooves whose axial direction is coincident with the width direction (sub-scanning direction) of the side of the light guide on which the patterns are formed.

A modification example of light scattering patterns at the portion near the incident face includes a large number of fine hemispherical concaves disposed in different densities in the longitudinal direction (main scanning direction) of the side of the light guide on which the patterns are formed.

A large number of the fine hemispherical concaves forming the light scattering patterns at the portion near the incident face may be continuously or separately formed and a depth of the hemispherical concave is preferably 0.23 or more to 0.33 or less of a diameter of a spherical part of the hemispherical concave.

According to the present invention a modification example of light scattering patterns at the portion near the incident face include triangular grooves or half cylindrical grooves having an axial direction which is slanted with respect to the width direction of the side of the light guide on which the scattering patterns are formed and wherein the axial direction of adjacent ones of the grooves is opposite to each other with respect to the width direction of the side of the light guide.

The present invention includes an image reader having the illuminating device incorporating the light guide as described above and a lens array focusing light reflected from a document out of light emitted from the illuminating device toward a line image sensor.

According to the present invention, the light scattering patterns formed on the side of the light guide are made into concavo-convex shape which can be formed at the time of forming the light guide, thereby enabling the manufacturing cost to be reduced. The light scattering patterns near the incident end face, in particular, are made independent of an angular dependence, thereby allowing avoiding a color unevenness which emphasizes specific colors at the vicinity of the incident face. In addition, the light scattering patterns away from the incident end face are made angle dependent, thereby enabling preventing reduction in amount of light emitted from the light-emitting surface.

DETAILED DESCRIPTION INCLUDING BEST MODE FOR CARRYING OUT THE INVENTION

Exemplary embodiments of the present invention are described below with reference to accompanying drawings. FIG. 1 is a cross section of an image reader using a line illuminating device incorporating the light guide according to one embodiment of the present invention. FIG. 2 is an exploded perspective view of the line illuminating device in FIG. 1. FIG. 3(a) is a front view of the light guide in FIG. 1, FIG. 3(b) is a rear elevation view thereof, FIG. 3(c) is a top view thereof, FIG. 3(d) is a bottom view thereof, FIG. 3(e) is a left side view thereof and FIG. 3(f) is a right side view thereof. FIG. 4 is an enlarged view of the light scattering patterns in the vicinity of the incident face of the light guide in FIG. 1.

The image reader is configured such that concave portions 1a and 1b are formed in a frame (housing) 1, the upper face of the concave portion 1a is covered with a transparent top plate 2 on which a document is placed, a line illuminating device 5 in which a rod-like light guide 3 is housed in a case 4 is obliquely fixed in the concave portion 1a, a substrate 8 having a line image sensor (photoelectric transducer) 6 and a driving circuit 7 thereof is fitted to the lower concave portion 1b and a lens array 9 for an equal magnification image is held in the frame 1.

A document placed on the top plate 2 is illuminated with a light beam emitted from the light-emitting surface of the line illuminating device 5 and the lens array 9 causes the reflected light to be incident on the linearly arranged image sensors 6.

The case 4 of the line illuminating device 5 is of U shape in cross section. The rod-like light guide 3 is fitted so that the light-emitting surface 3a thereof is positioned at the opening of the case 4. A light emitting unit 10 is attached to one end of the case 4. A blue element 10a, a red element 10b and a green element 10c are fitted to the light emitting unit 10 at equal interval across the normal line from the center line in the width direction of the bottom face 3b of the rod-like light guide 3.

The rod-like light guide 3 is produced by injection-molding transparent resin such as acryl and its surface includes a light-emitting surface. 3a, a bottom face 3b, left and right sides 3c and 3d and end faces 3e and 3f. One end face 3e opposes the light emitting unit 10, and light scattering patterns for scattering light incident from the end face 3e are formed on the bottom face 3b.

The light scattering patterns made different in shape between a portion near the end face 3e serving as the incident face and a portion away from the end face 3e. Incidentally, in the present embodiment, a region extending from the end face 3e to a distance of 60 mm is taken to be a portion near the incident face, and a region extending from over 60 mm to the other end face 3f is taken to be a portion away from the incident face.

The light scattering patterns 11 formed at the portion near the incident face are composed of a large number of fine hemispherical concaves, whereas the light scattering patterns 12 at the portion away from the incident face are composed of triangular grooves or half cylindrical grooves, and the axial direction of these triangular grooves or half cylindrical grooves coincides with the width direction (sub-scanning direction) of the bottom face 3b on which the patterns are formed. The surfaces of the light scattering patterns 11 and 12 may be mirror-finished or rough.

The hemispherical concaves serving as the light scattering patterns 11 reflect incident light beams in all directions, so that they are free from an angular-dependency. The light scattering patterns 12 reflect incident light beams mainly toward the light-emitting surface 3a, so that they are angle dependent.

FIGS. 5(a)-(c) are graphs showing relationships on each color basis between displacement in the main-scanning direction of the light guide and light intensity described in the foregoing embodiment. FIG. 5(a) shows light intensities at a floating amount of a document of 0 mm, FIG. 5(b) shows light intensities at a floating amount of a document of 3 mm and FIG. 5(c) shows light intensity ratios at a floating amount of a document of 0 mm and 3 mm.

As can be seen from FIG. 5(a), the intensities of light from each LED chip of RGB substantially coincide with each other at a main-scanning displacement of 10 mm or more, each color becomes weaker in intensity according as it is close to the incident end face in the region close to the incident end face with respect to a main-scanning displacement of 10 nm. When FIG. 5(a) is compared with FIG. 12(a) of a conventional art at a floating amount of a document is 0 mm, the colors in the light guide according to the present invention are substantially equal to each other in light intensity. Accordingly, the use of the light guide of the present invention enables to reduce the unevenness in color.

As can be seen from FIG. 5(b), even in a floating amount of a document of 3 mm, the waveforms in FIG. 5(b) are almost the same as those in FIG. 5(a) in which a floating amount of a document is 0 mm, and FIG. 5(c) shows that increase in a floating amount of a document has an insignificant effect on intensity ratio. The light guide of the present invention does not show a particular extraordinary rise in a main-scanning displacement of 15 mm unlike the conventional art, from which it is can be seen that the light guide of the present invention little causes the unevenness in color.

FIG. 6 is an enlarged view of the light scattering patterns viewed from the bottom face according to another embodiment. FIG. 7 is a cross section taken along line A-A of FIG. 6. In the present embodiment, each region of the light scattering patterns is produced by densely and continuously forming fine concave spheres 11.

For example, a cross sectional form of the concave sphere 11 is an arc with a depth of 0.02 mm to 0.03 mm which is formed by overlapping 0.09 mm-diameter circles each other in the range of 0.01 mm to 0.02 mm.

Results of experiments on the depth of the concave sphere II are described below. FIG. 8 is a graph showing the degree of unevenness in color obtained when the diameter of the sphere on which the concave sphere 11 is based is 30 μm and the depth of the concave sphere II is taken to be 7 μm to 10 μm, that is, when the ratio of the depth of the concave sphere 11 to the diameter of the sphere is 0.23 to 0.33. FIG. 9 is a graph showing the degree of unevenness in color obtained when the depth of the same concave sphere is a half (complete hemisphere) of the diameter thereof. Incidentally, as a condition of the experiments, the LED of R is arranged in the center. Therefore, since data of the R is always positioned at the center between the B and G, it is not depicted in the figure.

As can be seen from FIG. 8, the unevenness in color particularly in the vicinity of the LED is suppressed in the case where the ratio of the depth of the concave sphere 15 to the diameter of the sphere is 0.33. On the other hand, in FIG. 9, it can be seen that the unevenness in color is caused particularly in the vicinity of the LED. Incidentally, the same result was obtained as that in FIG. 8, when the ratio of the depth of the concave sphere 11 to the diameter of the sphere is 0.23.

From these figures, it turns out that the unevenness in color particularly in the vicinity of LED can be suppressed when the depth of the concave sphere is 0.23 or more to 0.33 or less of the diameter of the sphere, part of which is formed of the fine concave sphere.

FIGS. 10(a) to 10(c) are enlarged views of light scattering patterns in other embodiments, which are similar to FIG. 4. The configurations (front view, rear elevation view, top view, left and right sides and both end faces) in the these embodiments are same as the embodiment shown in FIG. 3, so that illustrations thereof are omitted.

The embodiment shown in FIG. 10(a) makes different the density of a plurality of hemispheric concave portions being the light scattering patterns 11 in the longitudinal direction of the light guide to adjust the intensity of reflected light. In the embodiments shown in FIGS. 10(b) and 10(c), the light scattering patterns 11 formed at the portion near the incident face are formed of triangular grooves or half cylindrical grooves, the direction of the axis of the triangular grooves or the half cylindrical grooves is slanted with respect to the width direction (sub-scanning direction) of the bottom face 3b on which the light scattering patterns 11 are formed and the direction of the axis of the adjacent triangular grooves or the adjacent half cylindrical grooves is opposite to each other. Specifically, in FIG. 10(b), the two triangular grooves or the two half cylindrical grooves are of X-shape. In FIG. 10(c), the two triangular grooves or the two half cylindrical grooves are of inverted V-shape.

Thus, an individual triangular groove or an individual half cylindrical groove is angle dependent, however, combining the two grooves with each other makes them free from an angular dependency.

FIG. 11 is a perspective view of the principle part of the light guide illustrating another embodiment. In the present embodiment, scattering regions 13 and 13 are provided on both sides 3c and 3d of the light guide near a light source 10 and flat chamfers 3g and 3h with an angle at which light reflected by the bottom face 3b is reflected toward the light-emitting surface 3a are formed between the sides 3c and 3d and the bottom face 3b on which the light scattering patterns are formed.

Thus, providing the scattering regions 13 and 13 on both the sides of the light guide near the light source disturbs incident light to reduce the unevenness in color of outgoing light. The scattering regions may be formed such that fine concaves and convexes are produced by injection molding, by printing white ink, or by roughening the surface with laser beams.

Forming flat chamfers 3g and 3h with a predetermined angle enables illuminance to be increased.

BRIEF DESCRIPTION OF THE DRAWINGS

FIG. 5(a) shows light intensities at a floating amount of a document of 0 mm;

FIG. 5(b) shows light intensities at a floating amount of a document of 3 mm;

FIG. 5(c) shows light intensity ratios at a floating amount of a document of 0 mm and 3 mm;

FIG. 12(a) shows light intensities at a floating amount of a document of 0 mm; FIG. 12(b) shows light intensities at a floating amount of a document of 3 mm; and FIG. 12(c) shows light intensity ratios at a floating amount of a document of 0 mm and 3 mm.

INDUSTRIAL APPLICABILITY

Figure 1:
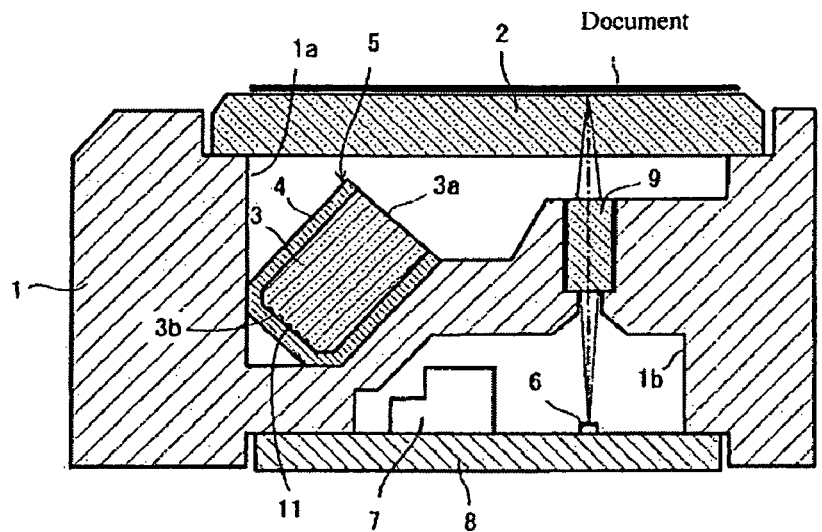
FIG. 1 is a cross section of an image reader using a line illuminating device incorporating a light guide according to an embodiment of the present invention.
Figure 2:
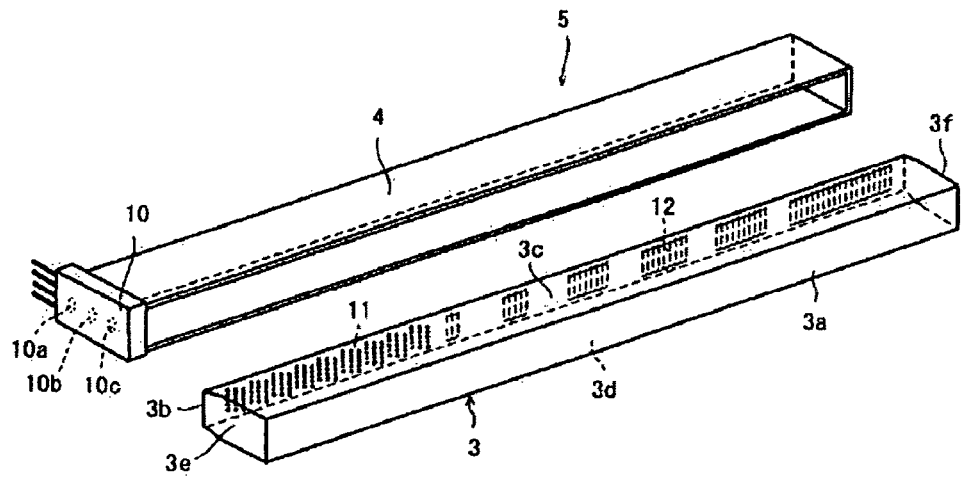
FIG. 2 is an exploded perspective view of the line illuminating device of FIG. 1.
Figure 3A:
FIG. 3(a) is a front view of the light guide of FIG. 1.
Figure 3B:
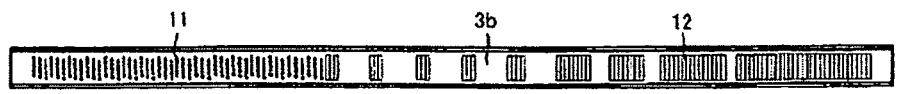
FIG. 3(b) is a rear elevational view thereof.
Figure 3C:
FIG. 3(c) is a top view thereof.
Figure 3D:
FIG. 3(d) is a bottom view thereof.
Figure 3E:
FIG. 3(e) is a left side view thereof.
Figure 3F:
FIG. 3(f) is a right side view thereof.
Figure 4:
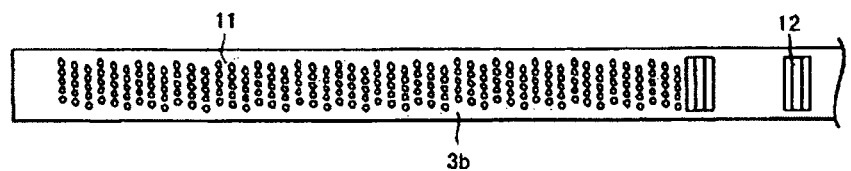
FIG. 4 is an enlarged view of light scattering patterns at the portion near the incident face of the light guide according to the present invention of FIG. 1.
Figure 5A:
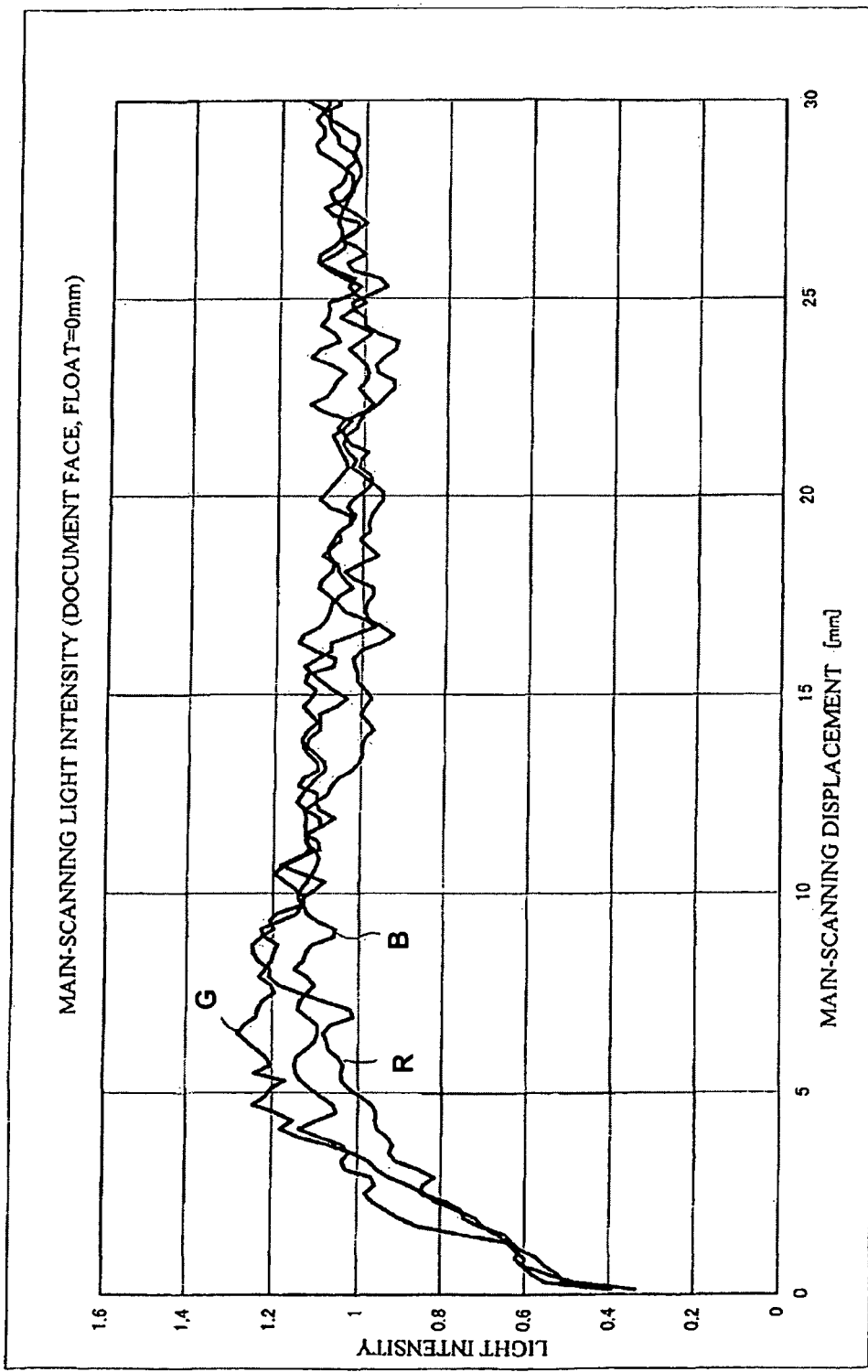
FIGS. 5(a)-(c) are graphs showing relationships on a color basis between displacement in the main-scanning direction of the light guide and light intensity described in the embodiment.
Figure 5B:
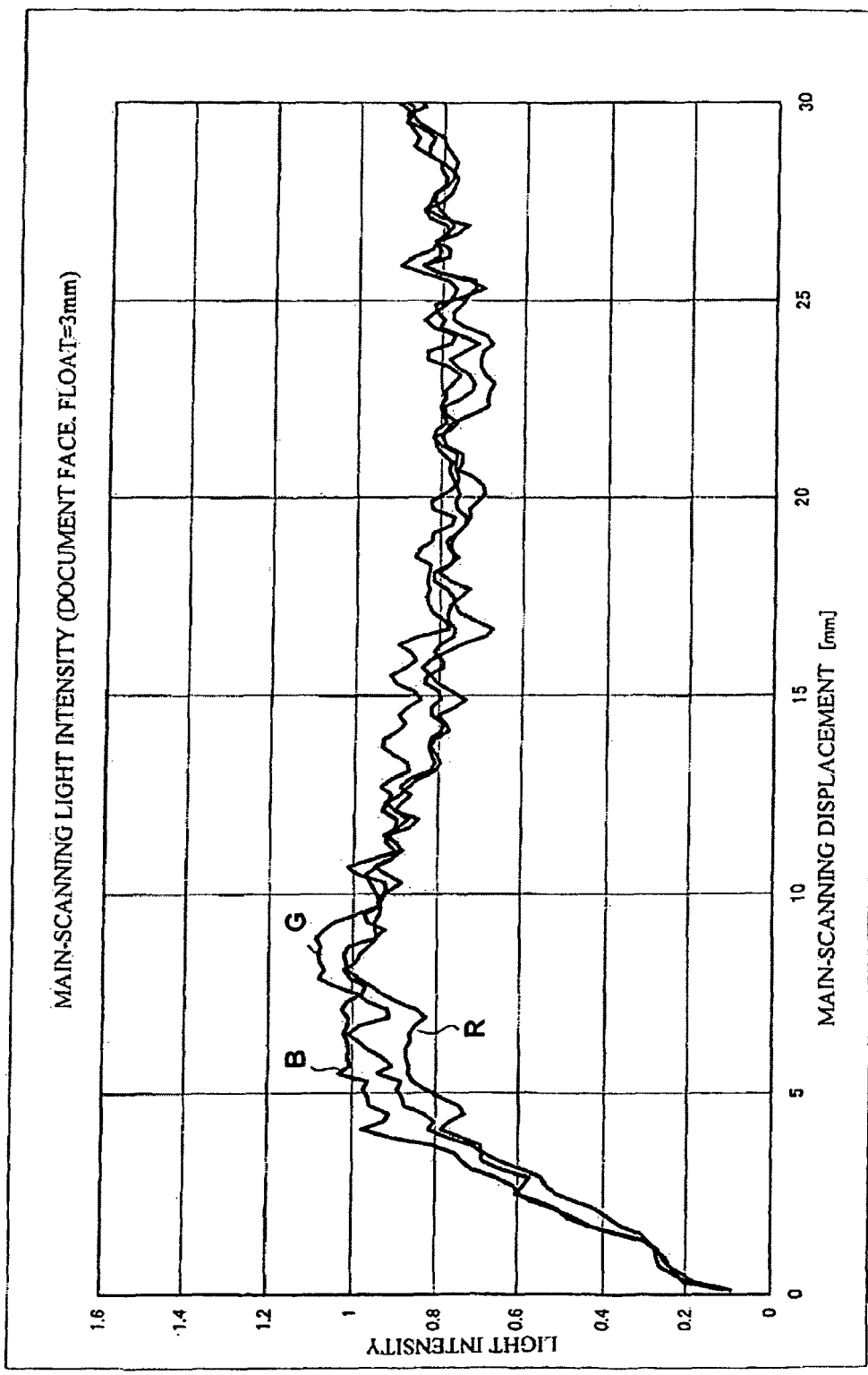
Figure 5C:
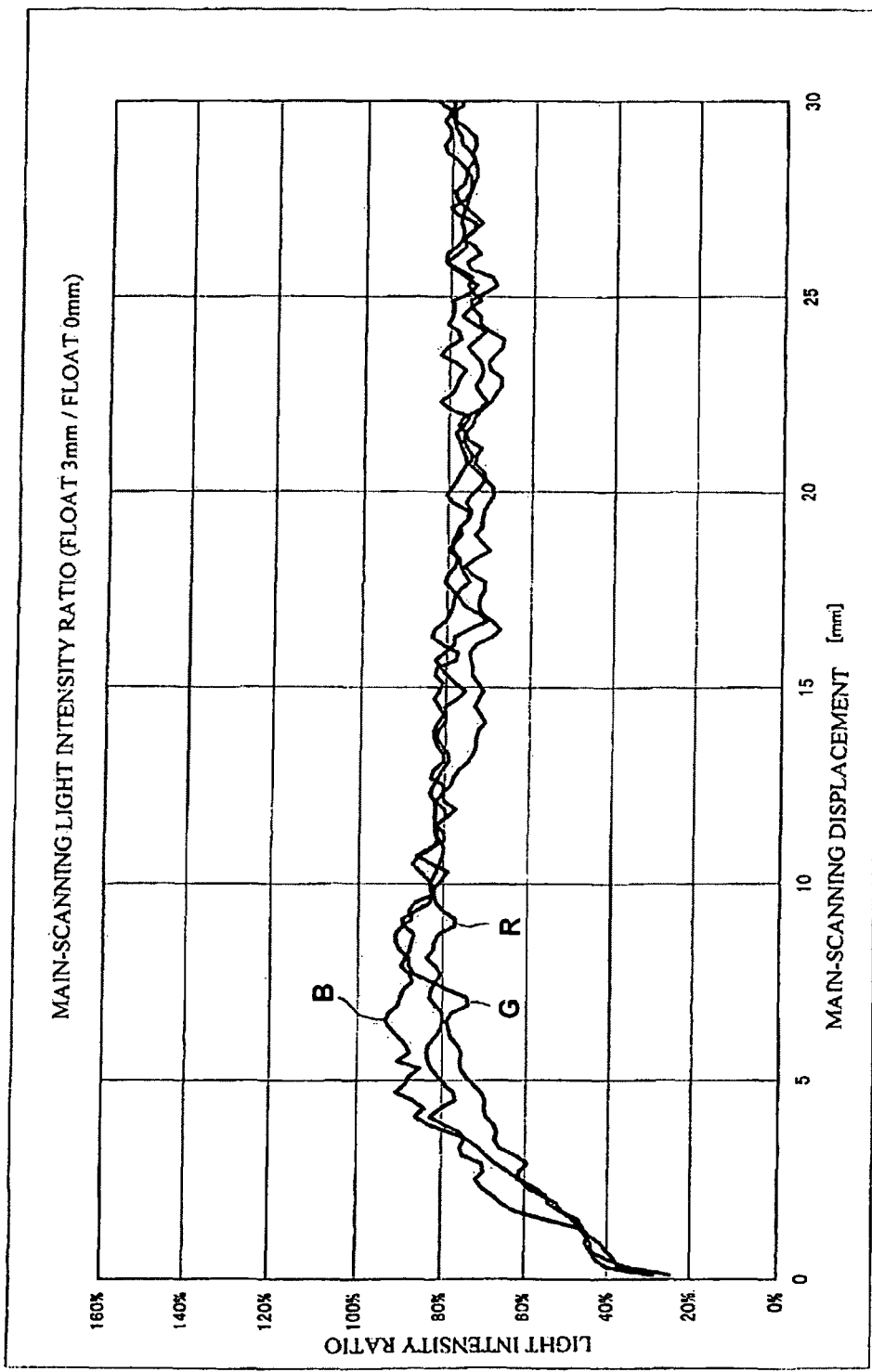
Figure 6:
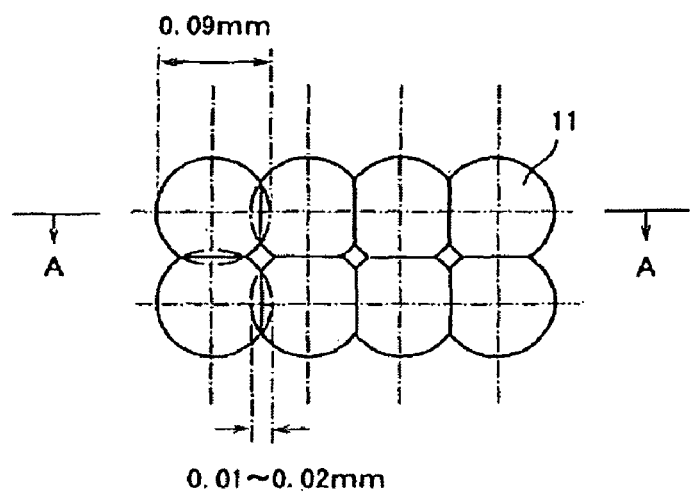
FIG. 6 is an enlarged view of the light scattering patterns viewed from the bottom face according to another embodiment of the present invention.
Figure 7:
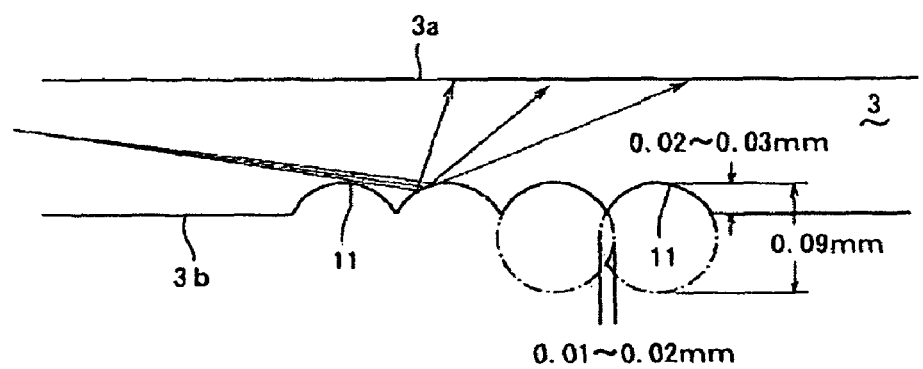
FIG. 7 is a cross section taken along line A-A of FIG. 6.
Figure 8:
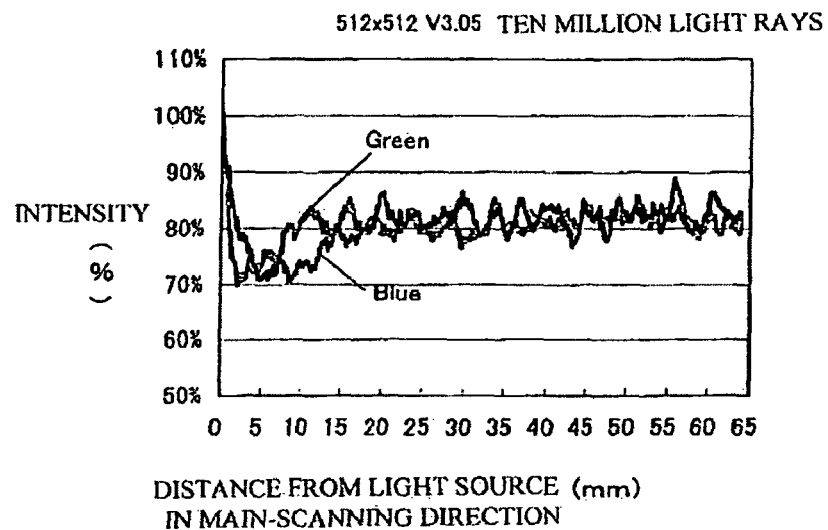
FIG. 8 is a graph showing the degree of unevenness in color obtained when the ratio of the depth of the concave sphere to the diameter of the sphere is ⅓ (0.33)
Figure 9:
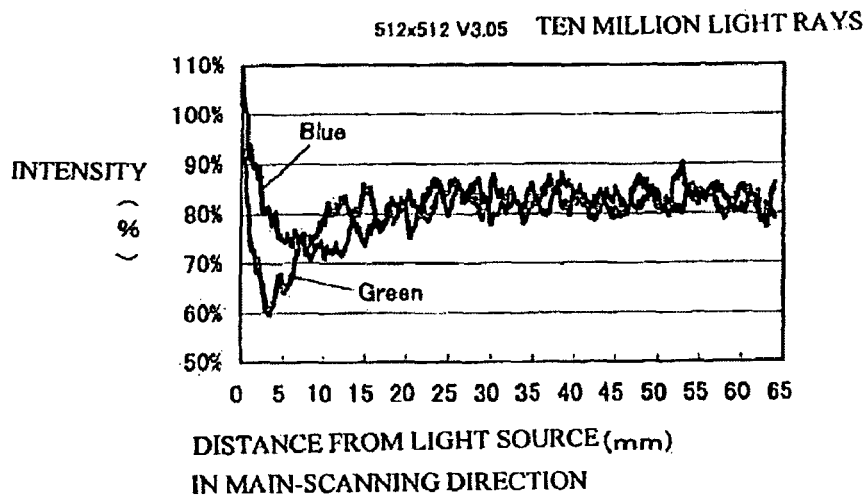
FIG. 9 is a graph showing the degree of unevenness in color obtained when the depth of the concave sphere is a half of the diameter of the sphere.
Figure 10A:
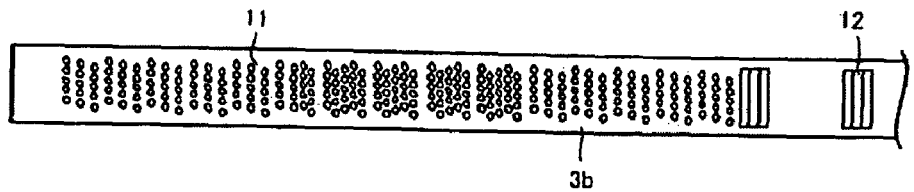
FIGS. 10(a) to 10(c) are enlarged views of light scattering patterns in other embodiments of the present invention, which are similar to FIG. 4.
Figure 10B:
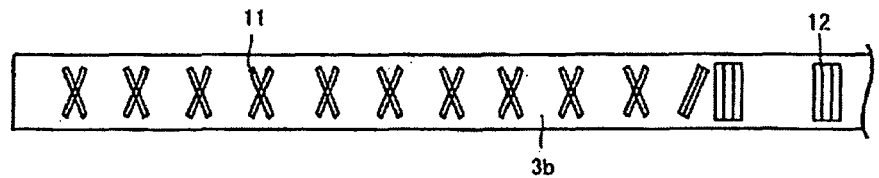
Figure 10C:
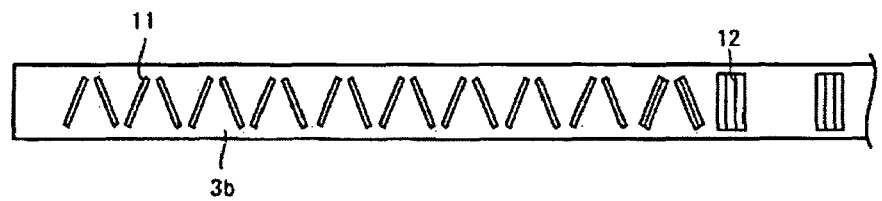
Figure 11:
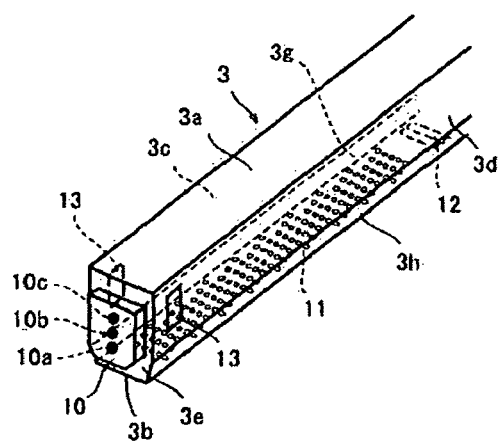
FIG. 11 is a perspective view of the principle part of the light guide illustrating another embodiment of the present invention.
Figure 12A:
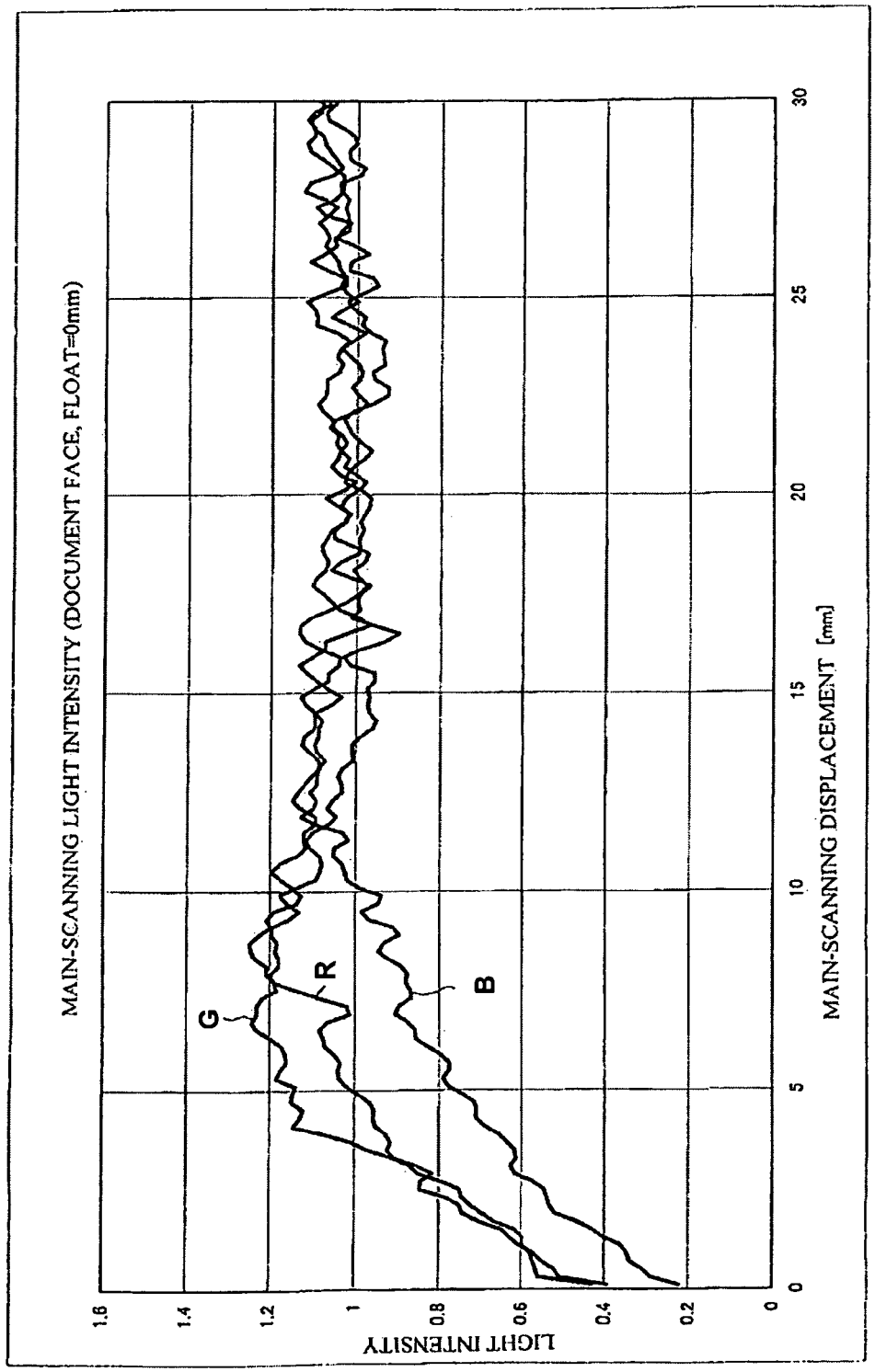
FIGS. 12(a)-(c) are graphs showing relationships between displacement in the main-scanning direction and the light intensity of a comparative light guide on which triangular grooves are formed as the light scattering patterns, and which are to be contrasted with the corresponding graphs in FIGS. 5(a)-(c)
Figure 12B:
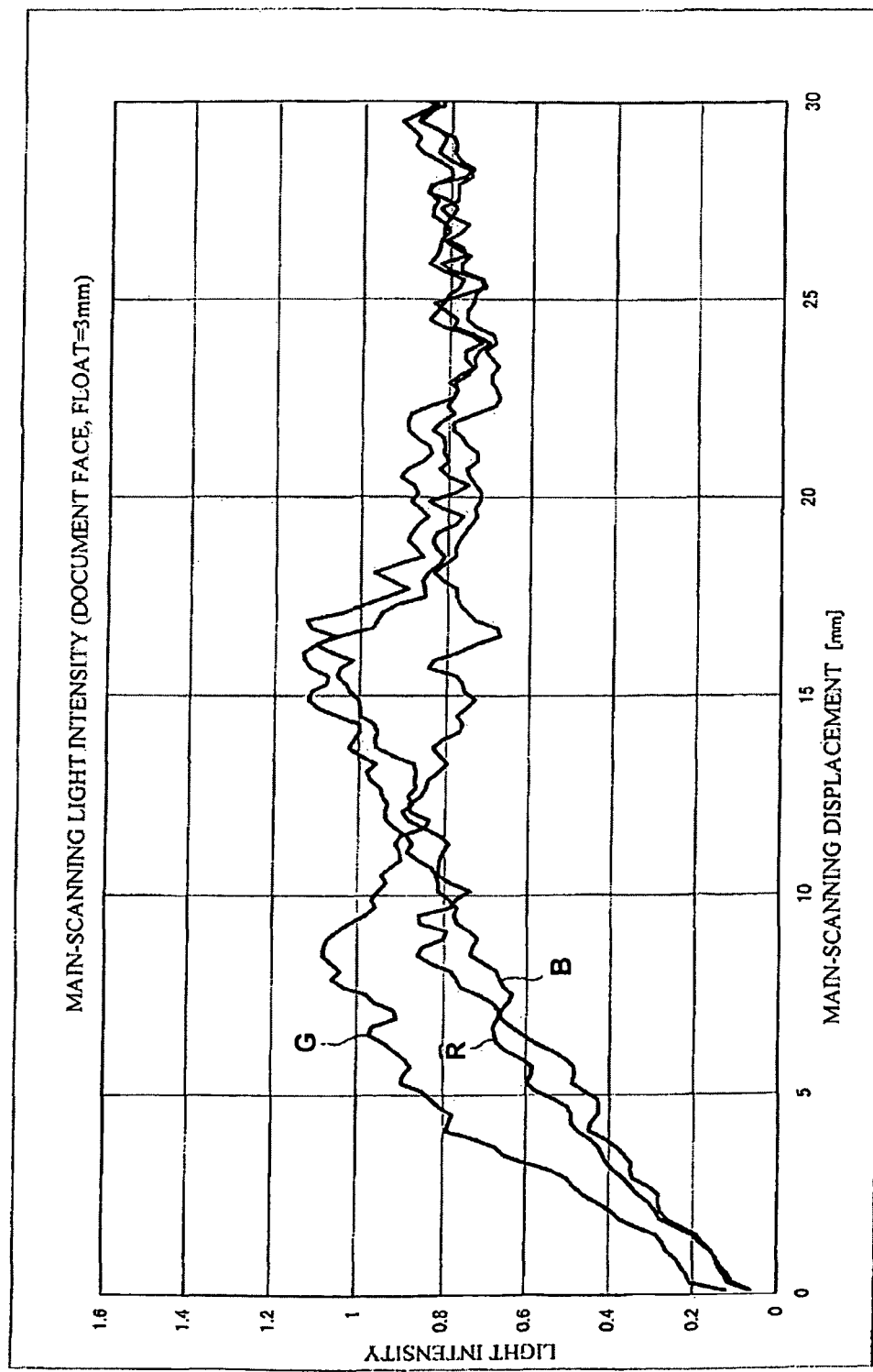
Figure 12C:
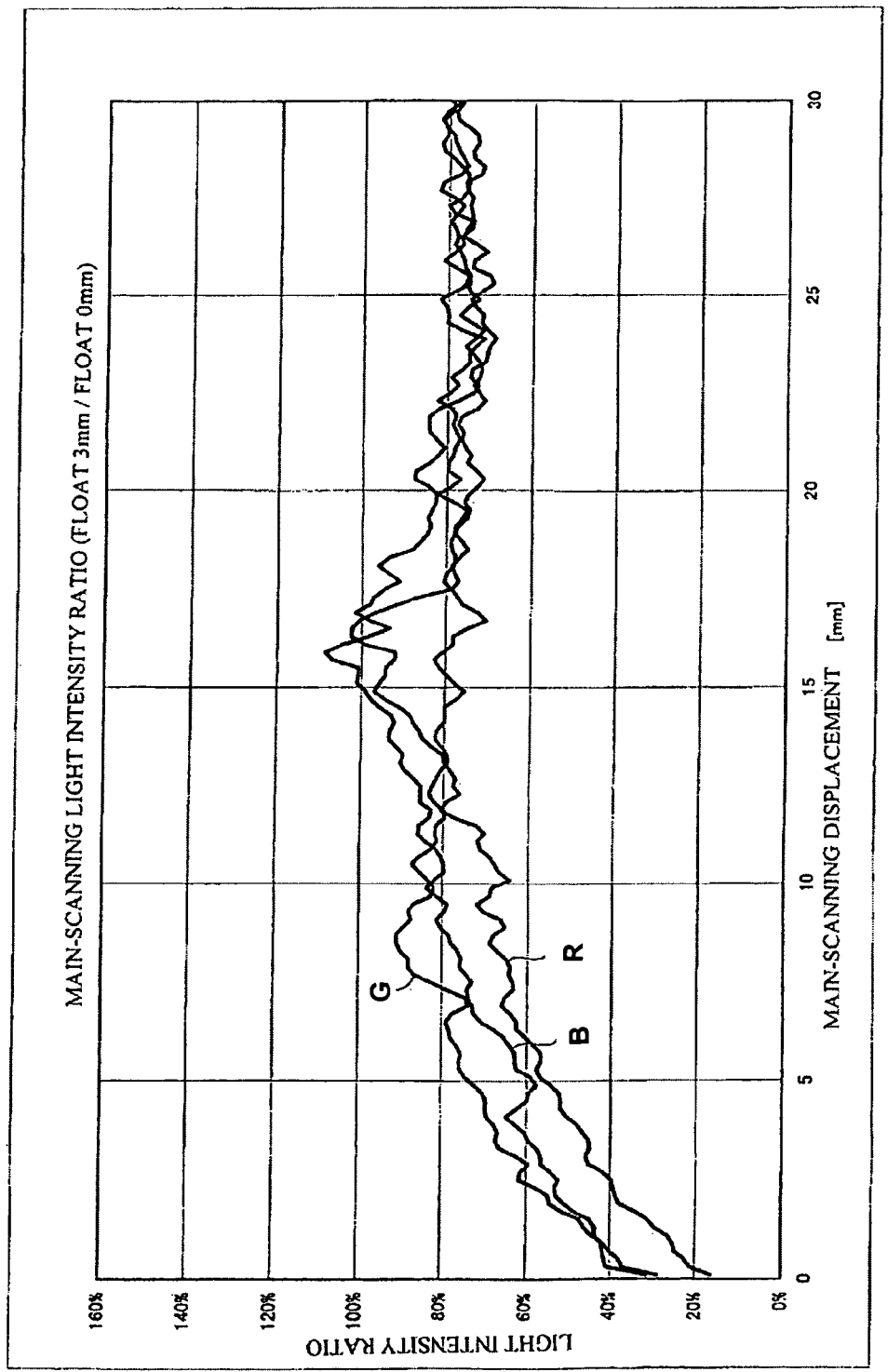

The illuminating device and the image sensor according to the present invention are incorporated into an image reader such as a copying machine, facsimile machine and the like to be effectively used.

Although there have been described what are the present embodiments of the invention, it will be understood that variations and modifications may be made thereto within the scope of the claims appended hereto.

The invention claimed is:

1. A rod-shaped light guide having an incident face at one longitudinal end thereof, a light-emitting surface at one side thereof, and light scattering patterns at another side thereof for reflecting light toward the light-emitting surface, wherein:
   the light scattering patterns are formed of concaves and convexes,
   at a portion of the light guide near the incident face the light scattering patterns have a shape free from an angular dependency whereby light is reflected by the patterns in all directions, including other directions than a direction toward the light-emitting surface, and
   at a portion of the light guide away from the incident face the light scattering patterns have a shape with an angular dependency whereby light is reflected by the patterns in the direction toward the light-emitting surface.

2. The light guide according to claim 1, wherein
   the light scattering patterns at the portion of the light guide near the incident face are formed of a large number of fine hemispherical concaves and the light scattering patterns at the portion of the light guide away from the incident face are formed of triangular grooves or half cylindrical grooves extending in an axial direction coincident with a width direction (sub-scanning direction) of the side of the light guide on which the patterns are formed.

3. The light guide according to claim 2, wherein
   a large number of the fine hemispherical concaves forming the light scattering patterns at the portion of the light guide near the incident face are arranged in different densities along a longitudinal direction (main scanning direction) of the side of the light guide on which the patterns are formed.

4. The light guide according to claim 2, wherein
   a large number of the fine hemispherical concaves forming the light scattering patterns at the portion of the light guide near the incident face are continuously or separately formed and a depth of each of the hemispherical concaves is 0.23 or more to 0.33 or less than a diameter of a spherical part of of the hemispherical concave.

5. The light guide according to claim 1, wherein
   the light scattering patterns at the portion of the light guide near the incident face are triangular grooves or half cylindrical grooves having an axial direction which is slanted with respect to a width direction of the side of the light guide on which the patterns are formed and the light scattering patterns at the portion of the light guide away from the incident face are triangular grooves or half cylindrical grooves having an axial direction which coincides with the width direction of the side on which the patterns are formed.

6. The light guide according to claim 5, wherein
   adjacent ones of the triangular grooves or the half cylindrical grooves forming the light scattering patterns at the portion of the light guide near the incident face are slanted opposite to each other in their axial direction with respect to the width direction of the side of the light guide.

7. The light guide according to claim 1, wherein
   the light guide further includes flat chamfers formed between both sides and the bottom face of the light guide and having an angle at which light reflected by a bottom face of the light guide is reflected toward the light-emitting surface.

8. The light guide according to claim 1, wherein
   scattering regions are provided on opposite sides of the light guide at the portion near the incident face.

9. An image reader characterized by comprising an illuminating device incorporating the light guide according to claim 1 and a lens array focusing light reflected from a document out of light emitted from the illuminating device toward a line image sensor.

10. The image reader according to claim 9, wherein
   the light scattering patterns at the portion of the light guide near the incident face are formed of a large number of fine hemispherical concaves and the light scattering patterns at the portion of the light guide away from the incident face are formed of triangular grooves or half cylindrical grooves extending in an axial direction coincident with a width direction (sub-scanning direction) of the side of the light guide on which the patterns are formed.

11. The image reader according to claim 10, wherein
   a large number of the fine hemispherical concaves forming the light scattering patterns at the portion of the light guide near the incident face are arranged in different densities along a longitudinal direction (main scanning direction) of the side of the light guide on which the patterns are formed.

12. The image reader according to claim 10, wherein
   a large number of the fine hemispherical concaves forming the light scattering patterns at the portion of the light guide near the incident face are continuously or separately formed and a depth of each of the hemispherical concaves is 0.23 or more to 0.33 or less than a diameter of a spherical part of the hemispherical concave.

13. The image reader according to claim 9, wherein
   the light scattering patterns at the portion of the light guide near the incident face are triangular grooves or half cylindrical grooves having an axial direction which is slanted with respect to a width direction of the side of the light guide on which the patterns are formed and the light scattering patterns at the portion of the light guide away from the incident face are triangular grooves or half cylindrical grooves having an axial direction which coincides with the width direction of the side on which the patterns are formed.

14. The image reader according to claim 13, wherein adjacent ones of the triangular grooves or the half cylindrical grooves forming the light scattering patterns at the portion of the light guide near the incident face are slanted opposite to each other in their axial direction with respect to the width direction of the side of the light guide.

15. The image reader according to claim 9, wherein
the light guide further includes flat chamfers formed between both sides and the bottom face of the light guide and having an angle at which light reflected by a bottom face of the light guide is reflected toward the light-emitting surface.

16. The image reader according to claim 9, wherein
scattering regions are provided on opposite sides of the light guide at the portion near the incident face.

* * * * *